H. SCHASER.
TIDE AND WAVE POWER MECHANISM.
APPLICATION FILED JUNE 15, 1914.
1,170,938.
Patented Feb. 8, 1916.
3 SHEETS—SHEET 1.
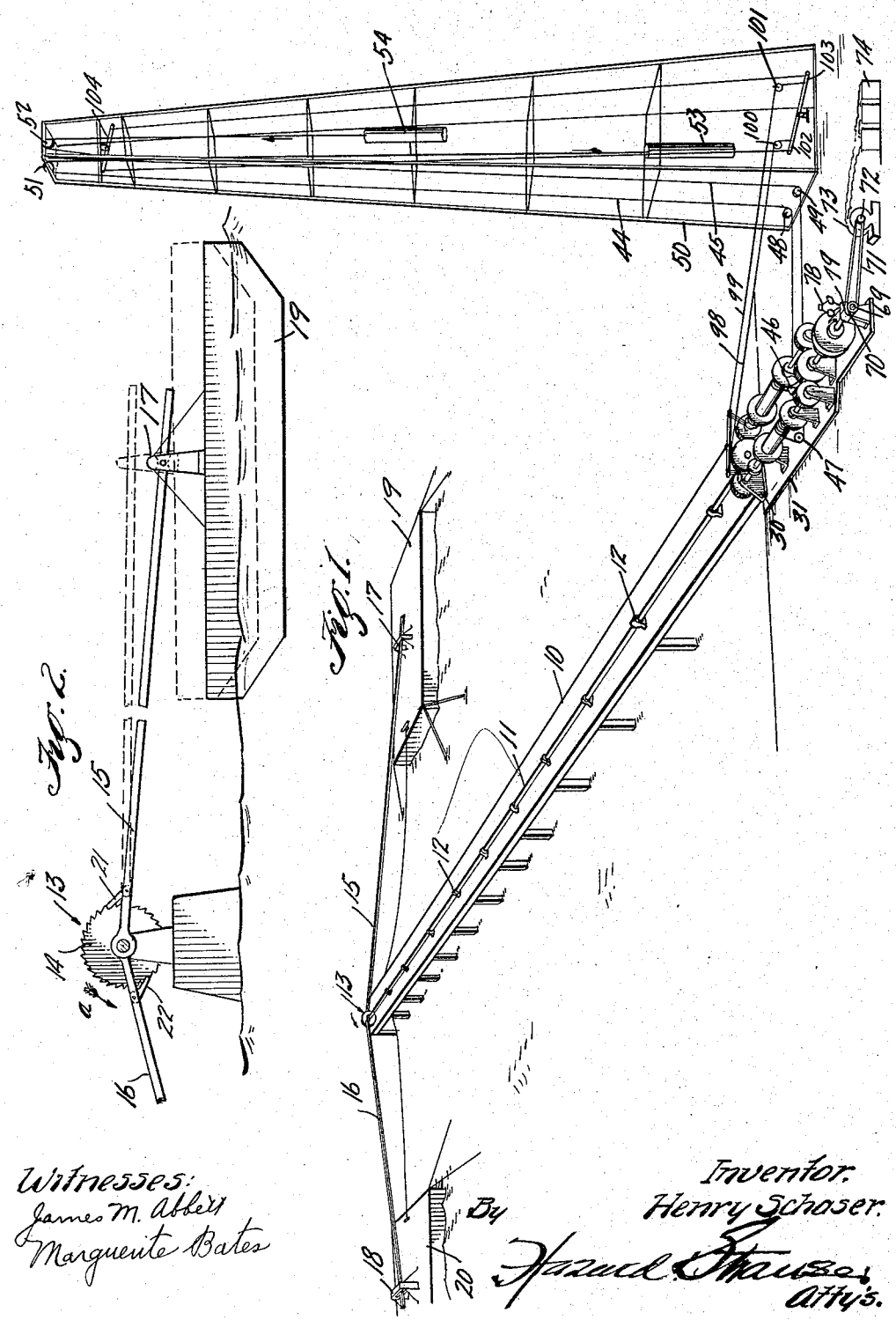

H. SCHASER.
TIDE AND WAVE POWER MECHANISM.
APPLICATION FILED JUNE 15, 1914.
1,170,938.
Patented Feb. 8, 1916.
3 SHEETS—SHEET 2.
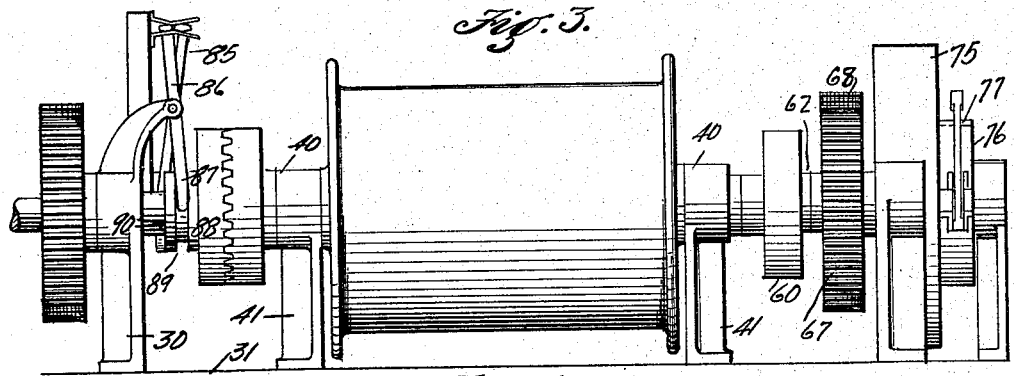
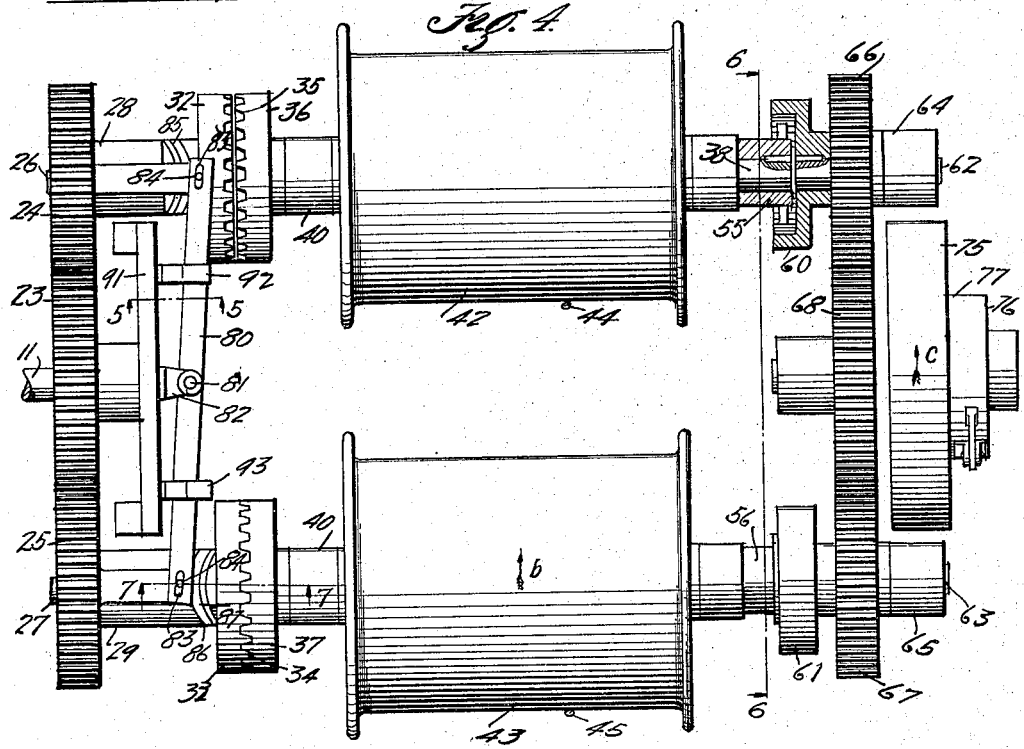
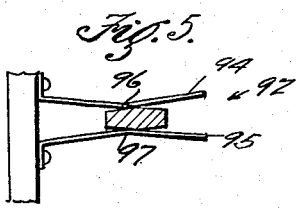
Witnesses:
James M. Abbott
Marguerite Bates
Inventor
Henry Schaser
By Harold Strause
Attys.

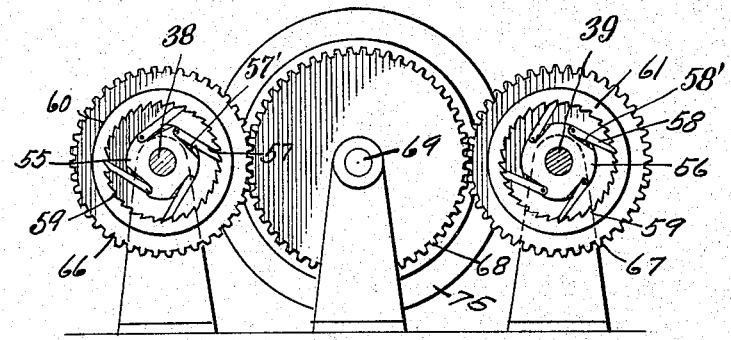
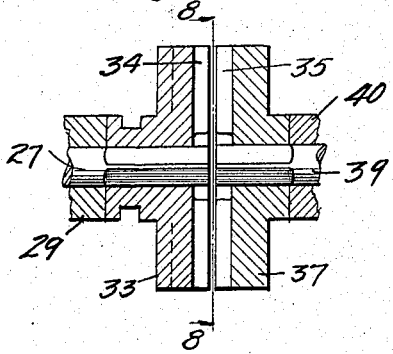
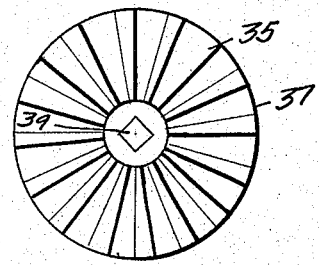
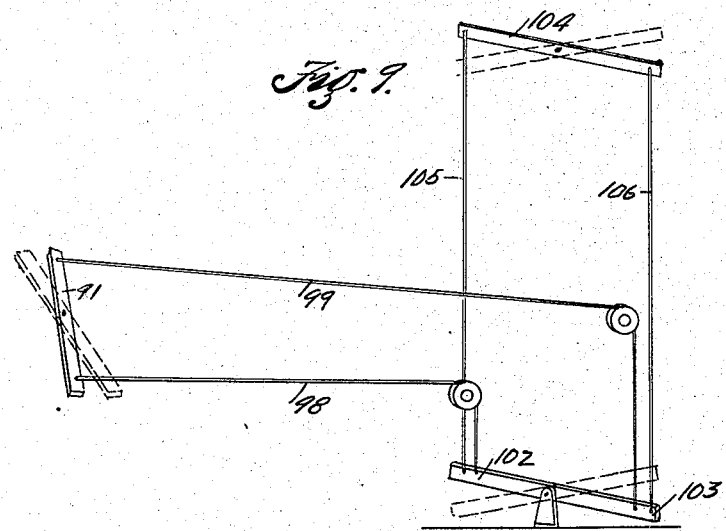

UNITED STATES PATENT OFFICE.

HENRY SCHASER, OF SIERRA MADRE, CALIFORNIA.

TIDE AND WAVE POWER MECHANISM.

1,170,938.  Specification of Letters Patent.  Patented Feb. 8, 1916.

Application filed June 15, 1914. Serial No. 845,080.

*To all whom it may concern:*

Be it known that I, HENRY SCHASER, a citizen of the United States, residing at Sierra Madre, in the county of Los Angeles, State of California, have invented new and useful Improvements in Tide and Wave Power Mechanisms, of which the following is a specification.

This invention relates to a mechanism for converting the power of waves and tides into mechanical energy.

It is the object of this invention to provide a mechanism adapted to be actuated by the rising and falling of floats by which the variable movements of such floats are converted into a constant and uniform rotary movement which may be utilized in the generation of electrical power or for other purposes.

A further object is to provide a mechanism of the above character employing weights with a simple and effective means operated by floats for elevating the weights, and embodying automatic means controlled by the weights, whereby they will be caused to descend by gravitation, and which further embodies means whereby the pull exerted by the descending weights will be converted into a constant rotary motion.

A further object is to provide a power transmission and generating mechanism including a pair of weights suspended on cables, and drums on which the cables are wound, with means controlled by floats for operating the drums to elevate the weights one at a time, and which is so constructed that one of the weights will be moving upward while the other is moving downward, and involving mechanism actuated by the downward moving weight for reversing the direction of respective movements of the weights independent of the movements of the float mechanism.

The invention is illustrated in the accompanying drawings, in which:

Figure 1 is a perspective view in diagram, illustrating the manner of assembling and arranging the various parts of the mechanism in relation to each other. Fig. 2 is a detail side elevation illustrating the manner of rotating the master wheel by means of a float. Fig. 3 is a detail in side elevation of the cable drum and the mechanism controlling same and controlled thereby. Fig. 4 is a plan view showing the pair of drums and the mechanism for rotating the drums alternately from the master wheel, and showing the mechanism by which the reverse movements of the drums will operate to rotate a drive shaft depicting one of the ratchet clutch devices in horizontal section. Fig. 5 is a detail section on the line 5—5 of Fig. 4 as seen in the direction indicated by the arrows. Fig. 6 is a vertical section partly in elevation on the line 6—6 of Fig. 4 as seen in the direction indicated by the arrows. Fig. 7 is a detail section and elevation on the line 7—7 of Fig. 4, with parts removed illustrating the clutch construction. Fig. 8 is a view in elevation of the lower clutch members as seen on the line 8—8 of Fig. 7 in the direction indicated by the arrows. Fig. 9 is a detail in perspective and diagram illustrating the mechanism for operating the driving clutches simultaneously as controlled by the descending or ascending weight to throw one clutch in and the other out.

In carrying out the present invention a suitable pier 10 is constructed and extends a suitable distance from the shore line and is provided for the purpose of supporting a drive shaft 11 which is mounted in bearings 12 on the pier 10. Mounted on the outer end of the shaft 11 is a large wheel 13, herein designated as a master-wheel, the outer periphery of which is formed with ratchet teeth 14. Pivotally mounted on the shaft 11 adjacent the master-wheel 13 is a pair of oppositely extending arms 15 and 16 the outer ends of which pass through and are slidably engaged in slotted frames 17 and 18 carried by floats 19 and 20 disposed on opposite sides of the pier 10 and spaced a distance therefrom; the floats 19 and 20 being of any suitable construction and securely anchored against abnormal movement in any desired manner.

Mounted on the arms 15 and 16 and normally engaged with the ratchet teeth 14 of the master-wheel 13 are pawls 21 and 22 which operate as the floats 19 and 20 rise and fall to rotate the master-wheel 13 and the shaft 11; the float 19 in rising actuating the master-wheel 13 through the pawl 21 and the float 20 in moving downward actuating the master-wheel 13 through the pawl 22. The float 20 preferably is weighted in excess of the float 19 so that the weight thereof will operate on its downward movement to rotate the master-wheel, whereas the upward movement of the float 19 caused by the rise of the water level on which it is supported will effect the rotation of the master-wheel.

The inner end of the shaft 11 carries a spur gear 23 securely mounted thereon which meshes with toothed wheels 24 and 25 disposed on the opposite sides thereof; the toothed wheels 24 and 25 being mounted on shafts 26 and 27 journaled in suitable bearings 28 and 29 carried by standards 30 formed on a bed plate 31 as shown in Fig. 1. Mounted on the ends of the shafts 26 and 27 opposite the toothed wheels 24 and 25 and splined thereon are slidable clutch members 32 and 33 formed with teeth 34 adapted to mesh with corresponding teeth 35 formed on clutch members 36 and 37 rigidly mounted on shafts 38 and 39 arranged in alinement with the shafts 26 and 27 and supported in bearings 40 carried on standards 41 secured to the bed plate 31. Rigidly mounted on the shafts 38 and 39 are drums 42 and 43 and wound on the drums in corresponding directions are cables 44 and 45 which pass downwardly around direction rollers 46 and 47, thence extend horizontally under and around direction rollers 48 and 49 at the base of a tower 50 of any suitable construction; the cables 44 and 45 thence passing upwardly and over pulleys 51 and 52 suitably mounted on the upper end of the tower 50. Secured to the ends of the cables 44 and 45 are weights 53 and 54 which are designed to be moved upwardly by the rotation of the drums 42 and 43 when said drums are in clutch connection with the shaft 11 and rotated by the latter in one direction and which weights will operate on disconnection of the drums from the shaft 11 to rotate the drums in a reverse direction independent of the shaft 11. Mounted on the shafts 38 and 39 carrying the drums 42 and 43 are collars 55 and 56 to which are pivotally connected a series of pawls 57 and 58 which extend in corresponding directions around the periphery of the collar and engage ratchet teeth 59 formed on the inner faces of annular members 60 and 61 rigidly mounted on stud shafts 62 and 63. The pawls 57 and 58 are normally positioned in engagement with the ratchet teeth 59 by springs 57' and 58' which bear between the sleeves and the pawls.

The stud shafts 62 and 63 are supported in suitable bearings 64 and 65 respectively carried on standards formed on the bed plate 31 and mounted on the stud shafts are pinions 66 and 67 which are arranged on diametrically opposite sides of a toothed wheel 68 and mesh therewith as shown in Fig. 4. The toothed wheel 68 is mounted on a shaft 69 carried in suitable bearings and disposed in alinement with the drive shaft 11; the shaft 69 being provided with a belt wheel 70 around which a belt 71 passes through which the rotary motion of the shaft 69 can be transmitted to any desired mechanism. In this case the belt 71 is shown as passing around a belt wheel 72 on an electric generator 73 by which electrical power may be generated and delivered to storage batteries 74, or to any other desired points of distribution.

As a means for equalizing the rotation of the shaft 69 a fly wheel 75 is mounted thereon which is fitted with a brake drum 76 having a band brake 77 thereon adapted to be controlled by a governor 78 of any suitable description adapted to be driven from the shaft 69 through a gear connection therewith indicated at 79.

The shaft 69 is designed to be rotated continuously in one direction at a uniform speed by the reverse rotation of either of the drums 42 or 43 which reverse movement is effected by the action of the weight 53 or 54 connected thereto in moving downward when either of the drums is out of engagement with the shaft 11 on the throwing out of the clutch connections; the shaft 69 being rotated through either of the pinions 66 or 67.

Means are provided controlled by the weights 53 and 54 whereby the clutch members 32 and 33 are automatically actuated by the weights on their reaching either their upper or lowermost positions to throw the clutch member out of engagement with the drum on which is wound the cable connecting with the uppermost weight thereby permitting the uppermost weight to move downward and unwind and actuate through the cable to which it is attached on its respective drum to rotate the latter in a reverse direction to that traversed in winding the cable thereon, and which reverse movement of the drum will operate through the pawls 57 and 58 to drive the shaft 62 or 63 through the annular members 60 or 61 according to which drum is reversed and thereby rotate the shaft 69. This means for operating the clutch members 32 and 33 is here shown as consisting of an arm 80 pivoted at 81 intermediate its ends on a bracket 82; the pivot 81 being disposed on a vertical plane in alinement with the centers of the line shafts 11 and 69 as shown in Fig. 4.

The outer ends of the arm 80 are formed with slots 83 which engage pins 84 carried on the upper ends of the clutch shifting levers 85 and 86 having yokes 87 engaging straps 88 carried in channels 89 on hubs 90 formed on the clutch members 32 and 33. Disposed on opposite sides of the pivot 81 and mounted on a suitable frame 91 are spring jaws 92 and 93 which extend outwardly and engage the arm 80 as shown in Fig. 5; the spring jaws consisting of a pair of plates 94 and 95 spaced a short distance apart and having central portions 96 and 97 converging toward each other and normally engaging the upper and lower sides of the arm 80. This arm 80 is preferably tapered in opposite direction from its longitudinal center on its top and bottom sides to form inclined surfaces which conform to the inclinations of the spring plates 94 and 95 of the jaws 92.

The spring jaws operate to retain the arm 80 in such position that one of the clutch members 32 or 33 will be retained in engagement with its corresponding clutch member, and the other clutch member will be held out of engagement with its corresponding clutch member, as shown in Fig. 4; the arm 80 being then positioned so that the outer end thereof on one side of the pivot 81 will be positioned between the plates 94 and 95 of the spring jaws on one side of the convergent portions 96 and 97 while the opposite end of the arm 80 will be disposed on the opposite side of the convergent portions 96 and 97.

The plates 94 and 95 are of such tension as to inhibit the free movement of the arm 80 and insure the positioning of the movable clutch members 32 and 33 out of and in engagement with the respective clutch members 36 and 37. Connecting with the arm 80 adjacent its ends are cables 98 and 99 which pass around suitable direction rollers 100 and 101 and connect with horizontally disposed connected lever arms 102 and 103 arranged adjacent the lower end of the tower 50 in the path of travel of the weights 53 and 54 respectively; the parts being normally so positioned in relation to each other that the arm 102 or 103 positioned beneath the downcoming weight will be disposed at an upward inclination, and the arm beneath the upgoing weight will extend in a downward direction and in such manner that when the downcoming weight strikes the arm therebeneath it will depress such arm and operate through the cable connected therewith to rock the arm 80 to reverse its position and thereby throw out one movable clutch member and engage the other in relation to their respective clutch members, thereby causing the lowermost weight to be reëlevated and permitting the uppermost weight to gravitate downward.

In event either of the weights should reach its uppermost position before the other weight reaches its lowermost position to actuate the clutch controlling mechanism means are provided adapted to be operated by the upgoing weight to operate the clutch controlling mechanism. This means is here shown as consisting of a pivoted arm 104 disposed adjacent the upper end of the tower 50 and having its outer ends connected through cables 105 and 106 to the outer ends of the lever arms 102 and 103 respectively, as shown in Fig. 9.

The arm 104 is positioned so that the end to which the cable 105 is attached will be disposed in the path of travel of the weight 53 when the latter is moving upwardly, and the outer portion of the arm 104 to which the cable 106 is connected is positioned in the path of travel of the weight 54 when the latter is moving upwardly. The cables 105 and 106 are of such length that when the arm 102 is moved downwardly the arm 104 will be rocked to tilt the end connected with the cable 105 in a downward direction. Likewise, when the arm 103 is rocked downwardly it will operate through the cable 106 to tilt the arm 104 in the opposite direction. The arms 102, 103 and 104 will thus be normally positioned to be operated either by an upgoing weight or a downgoing weight so as to insure the operating of the clutch mechanism to reverse the movements of the weights when either of them reaches an uppermost or a lowermost position.

In the operation of the invention, the upward movement of the float 19 and the downward movement of the float 20 will operate through the arms 15 and 16 and pawls 21 and 22 to rotate the master-wheel in the direction indicated by the arrow —a— in Fig. 2; the movements of the floats 19 and 20 imparting a more or less intermittent and variable motion to the master-wheel and the shaft 11. The rotation of the shaft 11 operates through the toothed wheel 23 thereon to drive the toothed wheels 24 and 25 in a direction opposite that of the master-wheel 13; the toothed wheels 24 and 25 turning in corresponding direction and rotating the shafts 26 and 27 and the clutch members 32 and 33 thereon at corresponding speeds and in like directions.

Assume the clutch member 33 to be in engagement with its clutch member 37 as shown in Fig. 4 and the clutch member 32 thrown out of engagement with its clutch member 36; the rotation of the clutch member 32 will then not effect the clutch member 36 and its connections, whereas the rotation of the clutch member 33 will operate to drive the clutch member 37, shaft 39 and drum 43 to rotate the latter in the direction indicated by the arrow —b— in Fig. 4, and thereby wind the cable 45 thereon; the winding of the cable 45 operating to elevate the weight 54. The clutch member 36 not being engaged by the driving clutch member 32 will permit the shaft 38 and drum 42 being rotated in a reverse direction by the action of the weight 53 which exerts a pull on the cable 44 in unwinding it from the drum 42 at a speed proportional to the resistance offered to the rotation of said drum. The rotation of the drum 42 and shaft 38 in a reverse direction causes the pawls 57 on the sleeve 55 to engage the ratchet teeth 59 on the member 60 so as to rotate the latter and the shaft 62 on which it is mounted in unison with the shaft 38 and in a corresponding direction. This rotation of the shaft 62 operates through the pinion 66 to drive the toothed wheel 68 and the shaft 69 in the direction indicated by the arrow —c— in Fig. 4, which is opposite to the direction of rotation of the master-wheel 13. This rotation of the shaft 69 operates through the belt wheel 70 to rotate the belt wheel 72 and the generator 73 through the belt 71. At the same time the gears 79 are operated to actuate the governor 78 which will operate through the brake 77 to retard any accelerated movement of the fly wheel 75.
The weights 53 and 54 are so proportioned to the amount of work or load imposed on the shaft 69 that a rapid downward movement of the weights is inhibited and an approximately steady pull thereof insured;
any variations in the load imposed on the propelling shaft 69 being compensated for by the governor 78. When the weight 53 reaches its lowermost position or the weight 54 reaches its uppermost position the arm 80 will be rocked on its pivot 81 through the medium of the cable 98 when a pull is exerted on the latter by the downward movement of the arm 102 which is actuated either by the downcoming weight 53 coming into contact therewith or by the upgoing weight 54 actuating the arm 104. This operation of the arm 80 throws out the clutch member 33 and throws in the clutch member 32 so that the relative movements of the weights 53 and 54 will be reversed; the drum 42 in winding the cable 44 thereon through the action of the floats and reëlevating the weight 53, while the weight 54 will move downward and operate to rotate the shaft 69 through the drum 43, pawls 58, shaft 63, pinion 67 and toothed wheel 68.

By the construction and arrangement of the transmission mechanism between the shafts 11 and 69 the latter will be rotated in one direction irrespective of the direction of movements of the drums in relation to each other and by the construction and arrangement of the clutch controlling mechanism the movement of one weight in an upward direction and the downward movement of the other weight will be insured, thereby effecting a practically continuous rotation of the shaft 69 independent of variations of rotation of the shaft 11.

What I claim is:

1. In a tide and wave motor, the combination with a shaft, float operated means for rotating said shaft in one direction, a power shaft, and means interposed between said shafts, whereby the variable rotation of the first-named shaft will be transmitted into uniform rotation of the last-named shaft, including a plurality of weights, means for elevating said weights independent of each other controlled by the first named shaft, and means, whereby the weights will operate independent of each other on gravitating downward to rotate the last named shaft.

2. In a tide and wave motor, the combination with a shaft, a float means actuated by the rise and fall of the float for rotating the shaft in one direction, a pair of drums, cables wound on said drums, weights supported by said cables, means for rotating the drums alternately from the shaft controlled by the weights to cause one weight to be elevated while the other is descending, a second shaft, and means controlled by the downwardly moving weight for rotating said shaft continuously.

3. In a tide and wave motor, a pair of drums, cables on said drums, weights suspended on said cables, a drive shaft, a float, means for rotating said drive shaft by the float in one direction, means for alternately rotating the drums from said drive shaft to alternately elevate the weights, a power shaft, and means controlled through the drums, whereby the weights moving downward will rotate the power shaft continuously.

4. In a tide and wave motor, a pair of drums, cables on said drums, weights suspended on said cables, a drive shaft, a float, means for rotating said drive shaft by the float in one direction, means for alternately rotating the drums from said drive shaft to alternately elevate the weights, a power shaft, and means controlled through the drums, whereby the weights moving downward will rotate the power shaft continuously, and means for regulating the speed of rotation of the power shaft.

5. In a tide and wave motor, a pair of drums, cables wound on said drums, weights attached to said cables, a power shaft, means whereby the rotation of either of the drums on the unwinding of the cable therefrom will rotate the power shaft continuously in one direction, a second shaft, float means for rotating said shaft in one direction, means for rotating the drums separately from said last-named shaft, and means controlled by the weights for throwing the drums alternately in and out of operative connection with said shaft.

6. In a tide and wave motor, a pair of drums, cables wound on said drums, weights attached to said cables, a power shaft, means whereby the rotation of either of the drums on the unwinding of the cable therefrom will rotate the power shaft continuously in one direction, a second shaft, float means for rotating said second shaft in one direction, means for rotating the drums separately from said last-named shaft, and means controlled by the weights for throwing the drums alternately in and out of operative connection with said shaft, including a pair of clutch members, and means for oppositely shifting the clutch members controlled by the weights.

In witness that I claim the foregoing I have hereunto subscribed my name this 26th day of May, 1914.

HENRY SCHASER.

Witnesses:
MARGUERITE BATES,
MARIE BATTEY.

Copies of this patent may be obtained for five cents each, by addressing the "Commissioner of Patents, Washington, D. C."